UNITED STATES PATENT OFFICE.

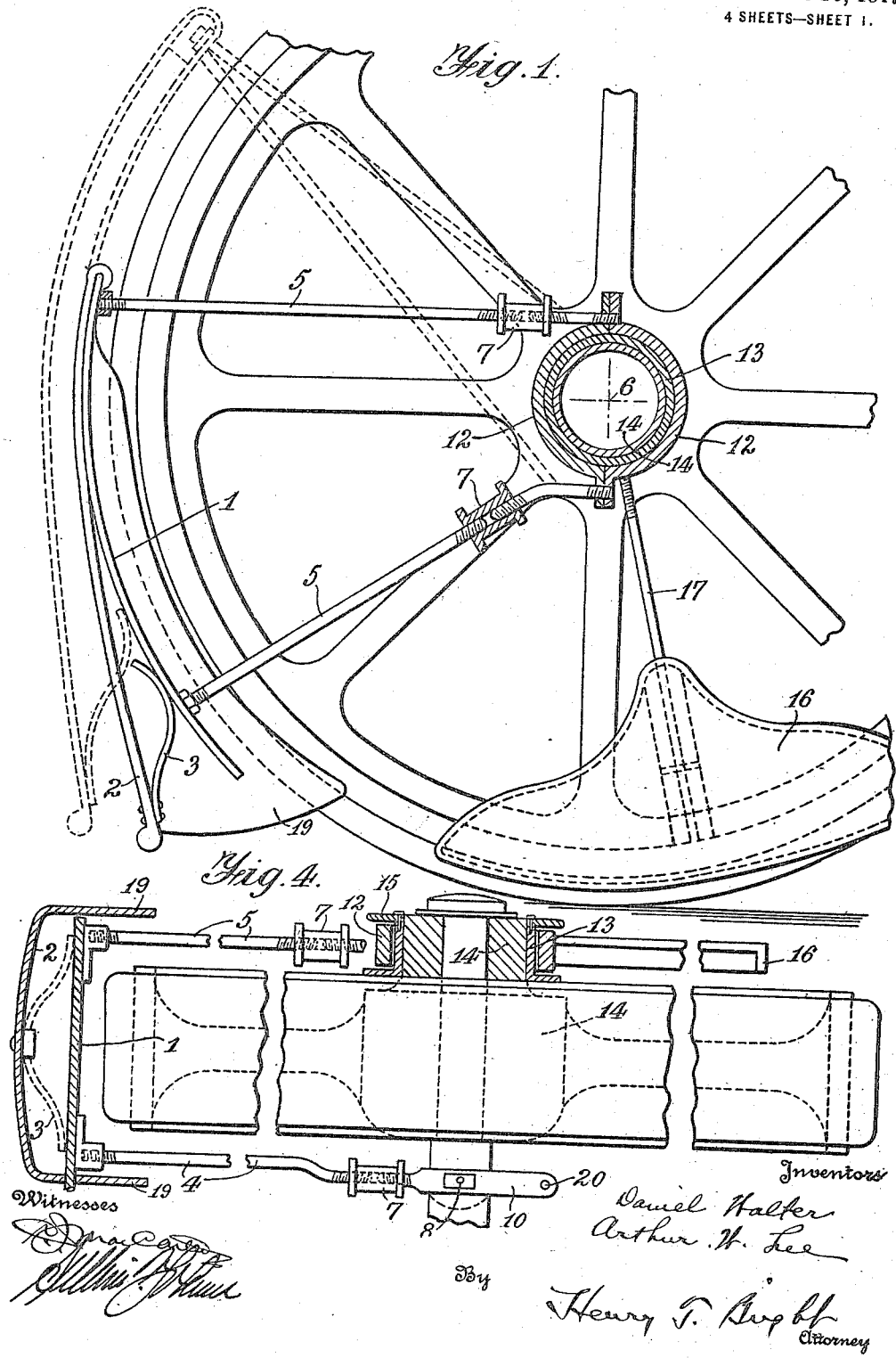

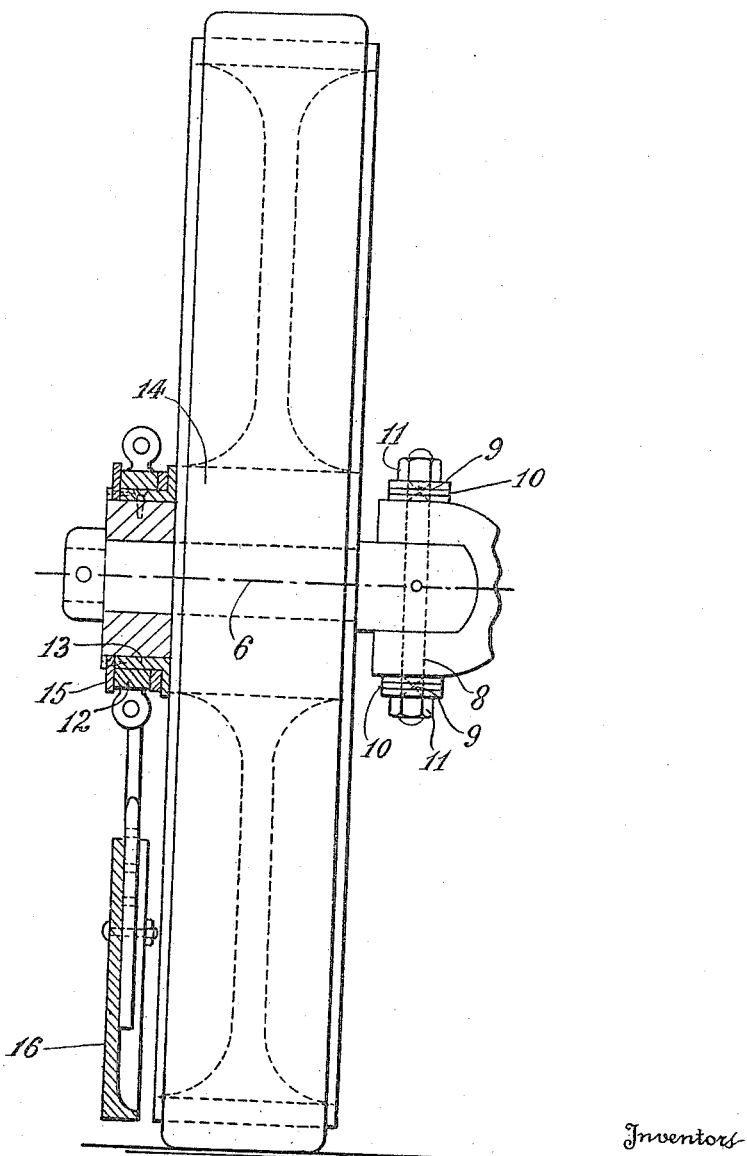

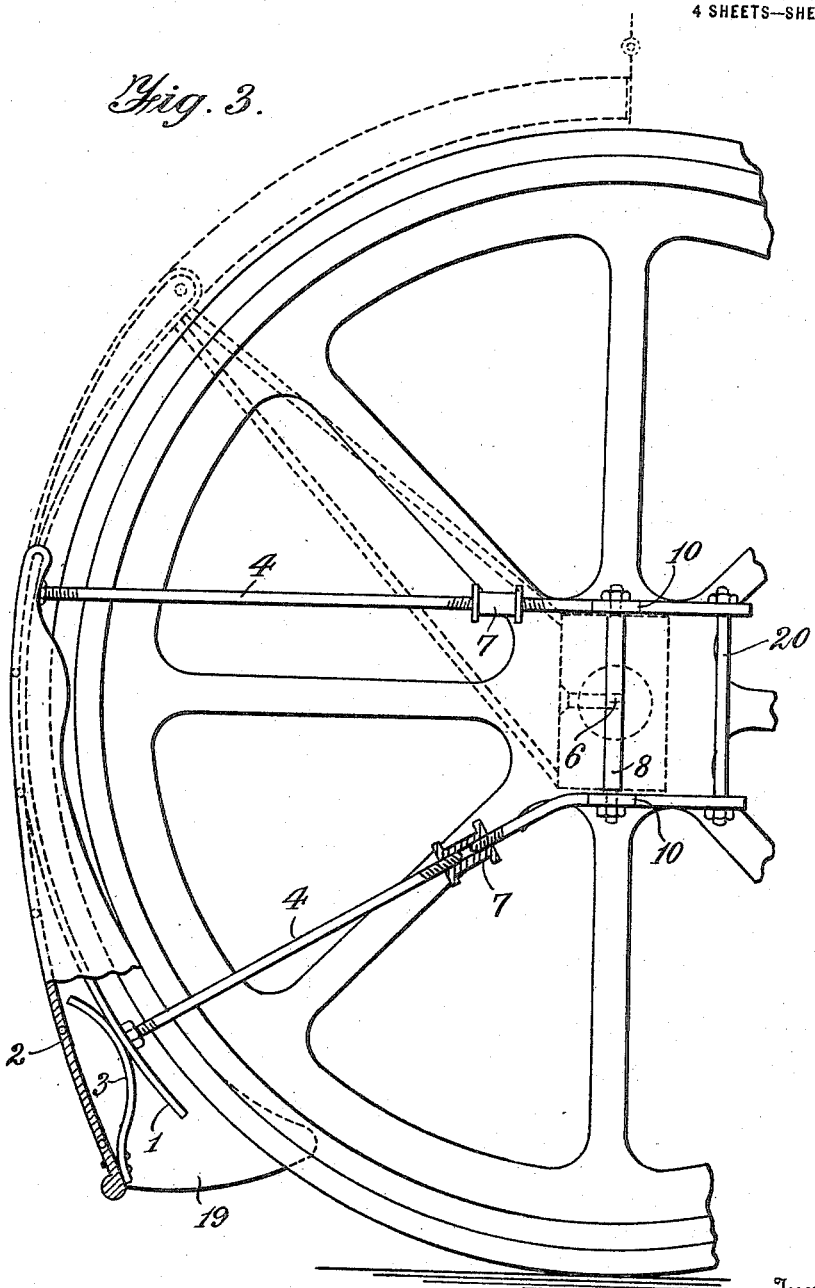

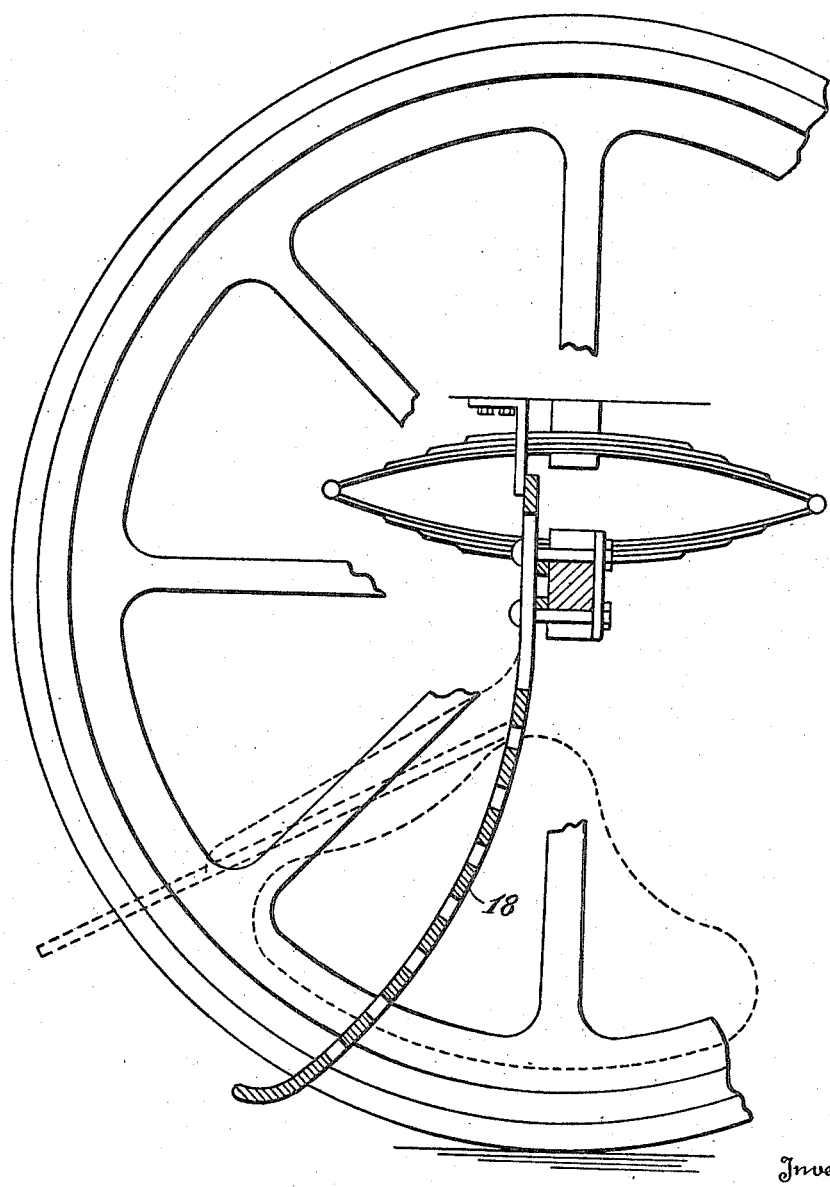

DANIEL WALTER, OF HOVE, AND ARTHUR WALTER LEE, OF PORTSLADE, ENGLAND.

LIFE-GUARD FOR ATTACHMENT TO MOTOR AND OTHER VEHICLES.

1,229,554.

Specification of Letters Patent. Patented June 12, 1917.

Application filed January 29, 1916. Serial No. 75,190.

*To all whom it may concern:*

Be it known that we, DANIEL WALTER, builder, of Grosvenor House, New Church Road, Hove, Sussex, and ARTHUR WALTER LEE, motor engineer, of 23 Station Road, Portslade, Sussex, England, have invented new and useful Improvements in and Relating to Guards, More Particularly Life-Guards, for Attachment to Motor and other Vehicles; and we do hereby declare the following to be a full, clear, and exact description of the invention, such as will enable others skilled in the art to which it appertains to make and use the same.

This invention relates to life guards for motor vehicles in which a segmental plate carrying in advance of it a further and resilient plate, both of which are connected at their upper extremities, is arranged in advance of the wheels thereof and so connected as to turn therewith.

The primary object of this invention is the production of a life guard of the above type which shall be simple and light in construction and which may be readily detached when desired without disturbing any other portions of the vehicle. It is also designed to fulfil the regulations as regards overall dimensions.

Besides its use as a life guard a further object of the invention is to adapt certain constructional features to perform the functions of a mud or splash guard in addition to their primary use.

A guard according to this invention comprises a metal segmental plate arranged in spaced relation to and in advance of the wheel or wheels of the vehicle in which position it is unmovably supported by stays attached, at diametrically opposed points by their inner ends the outer stays to the hub of the wheel and the inner stays to the stub axle so as to turn therewith which segmental plate supports, on its outer face a resilient member such as a flat or curved blade of spring steel in such a manner that the two are in spaced relation at their lower ends with means therebetween for resiliently resisting the inward movements of such outer member.

In order that our invention may be fully understood we will now proceed to describe the same by aid of the accompanying drawings in which:—

Figure 1 is a side elevation partly in section of the outside of a vehicle wheel fitted with our invention.

Fig. 2 a vertical section thereof with a portion of the guard removed.

Fig. 3 a similar view to Fig. 1 but wholly in elevation and taken on the inside of the wheel.

Fig. 4 is a plan view with the parts in section.

Fig. 5 a sectional elevation of a detail hereafter to be described.

In the practical application of this invention shown in the drawings, suitable for use on two or more wheeled vehicles, the life guard is mounted slightly in advance of the front or steering wheels although the same is equally applicable to the rear wheels and consists of a metal plate 1 conforming to the curvature thereof, to the upper and forward edge of which is riveted a resilient member 2 which may be constructed from a plate of spring steel or built up from bars or rods, which member 2 is arranged in spaced relation to the aforesaid metal plate 1 at its lower end, which end supports a curved blade spring or springs 3, the forward point of which rests against the said metal plate 1.

By this construction all obstructions striking this forward resilient plate 2 cause it to bend inward under the sudden shock against the resisting action of the said interposed blade spring or springs 3.

The curved metal plate 1 aforesaid with its above described detachments is supported from both sides of the wheel it shields in such a manner that it always retains its normal relative position to such wheel, that is, directly in advance thereof.

One practical mode of attachment which has been found suitable in attaining the above object is illustrated in the drawings and comprises four stays 4, 4 and 5, 5 although more or less may be used as desired, half being arranged upon one side of the wheel and half on the other, the two or more stays at each side being arranged one above and the other below the axis 6 of the wheel.

These stays are preferably constructed in two halves, the opposing ends of which are threaded and are each engaged by a similarly threaded socket 7 so that the removal of the guard is readily effected without having to disturb the other parts.

The pair of inside stays 4, 4 are secured to the two extremities of the usual vertical gudgeon pin 8 serving to secure the wheel spindle to the forked end of the front axle, which pin is suitably prepared to receive it.

The portion of the gudgeon pin 8 which projects at each end beyond the forked extremities of the front axle is squared for part of its length as at 9 to receive the flattened extremities 10 of the inner ends of the stays aforesaid, the other part of its length being threaded to receive a nut 11 for holding the whole in position.

This gudgeon pin 8, is, for preference, secured to the wheel spindle so as to turn therewith within the forked extremities of the front axle.

The outer pair of stays 5, 5 are secured, at diametrically opposite points, by their inner ends to a metal ring 12 which in turn is loosely mounted upon a circular bearing 13, which bearing is formed upon or in the wheel hub 14. The whole is kept in position by a suitable flange or other device 15, screwed or otherwise secured upon the outer end of the said circular bearing 13.

Depending from the above-mentioned metal ring is a weighted member 16 which acts as a cantaliver to support the weight of the life guard and this may be so formed as to fulfil the functions of a splash guard.

For this purpose it depends to within a short distance of the ground so as to catch the mud or water thrown outwardly by the wheel tire.

In the construction as shown this weighted member 16 is of a narrow section and of a width suitable for effecting the purposes above-mentioned and is adjustably secured to the lower end of a rod 17, the upper end of which is secured to the metal ring 12 aforesaid. Connection between the two may be effected in any known manner and preferably with a view to allowing relative movement therebetween so as to clear obstructions.

In practice it is intended to employ one such guard as above described upon each side of the vehicle. Further, if desirable, they may be connected together across the front of the vehicle to increase the protection afforded. Or in lieu of this arrangement, a separate guard 18 may be arranged intermediate the two in advance of the steering wheels, which central guard may be of any desired construction and may either be fixed to the vehicle or arranged to turn with the steering wheels.

It is not our wish to confine ourselves strictly to a device constructed according to the above described practical application as the same may be modified without departing from the spirit of the invention. For instance, if desired, suitable wind guards 19 may be arranged upon each side of the curved plate so as to partially inclose the adjacent portion of the wheel. The flattened ends of the inside stays may likewise be extended beyond their support, namely the vertical gudgeon pin 8, and there clamped in position by a vertically arranged bolt passing therethrough and denoted in Fig. 3 of the drawings by the reference numeral 20.

Furthermore, these inside stays may pivot on the gudgeon pin, the outer stays being then relied upon to retain the relative positions of the wheel and guard.

What we do claim as our invention and desire to secure by Letters Patent is:—

1. The combination with the axle and wheel of a vehicle, of a guard member loosely supported by the axle and arranged in front of the wheel and counterbalance means connected with said guard member and acting to normally maintain the same in an operative position with respect to the wheel, said counterbalance means permitting of swinging movement of the guard member, for the purpose set forth.

2. The combination with the axle and wheel of a vehicle, of a member loosely mounted upon the axle, a guard member carried by said first named member and arranged in advance of the wheel, a rod carried by said first member and a weight slidably mounted upon said rod for the purpose set forth.

In testimony whereof we have signed our names to this specification in the presence of two witnesses.

DANIEL WALTER.
ARTHUR WALTER LEE.

Witnesses:
ALBERT PIERCE,
ROBERT AUSTEN RANDELL.